Aug. 7, 1956

A. FREEMAN 2,757,781

CONVEYOR SYSTEM

Filed Jan. 16, 1953

INVENTOR
Alfred Freeman
BY

Aug. 7, 1956 — A. FREEMAN — 2,757,781
CONVEYOR SYSTEM
Filed Jan. 16, 1953 — 6 Sheets-Sheet 2

INVENTOR
Alfred Freeman
BY

Aug. 7, 1956

A. FREEMAN 2,757,781

CONVEYOR SYSTEM

Filed Jan. 16, 1953

INVENTOR
Alfred Freeman
BY

Aug. 7, 1956
A. FREEMAN
2,757,781
CONVEYOR SYSTEM
Filed Jan. 16, 1953
6 Sheets-Sheet 4
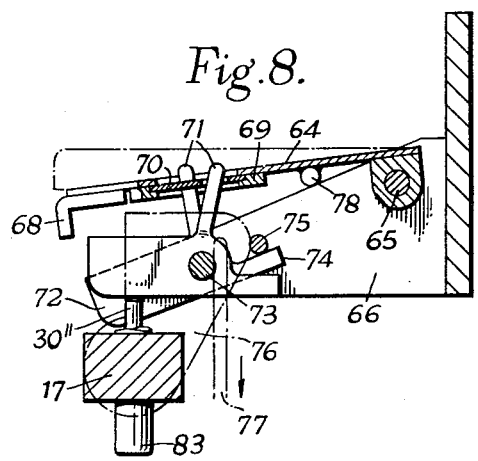
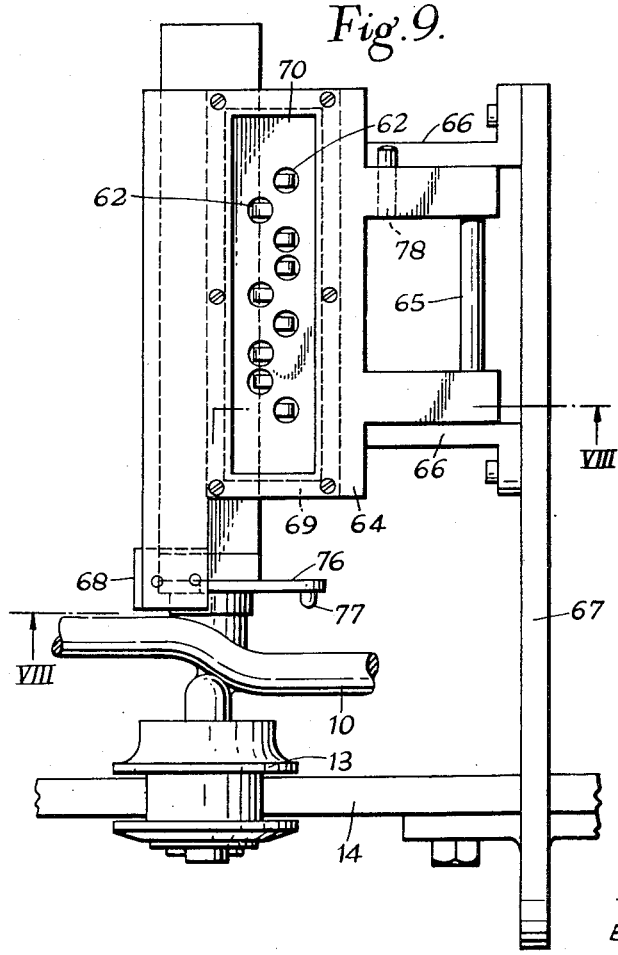
INVENTOR
Alfred Freeman
BY Aug. 7, 1956

A. FREEMAN 2,757,781

CONVEYOR SYSTEM

Filed Jan. 16, 1953

INVENTOR
Alfred Freeman
BY

Aug. 7, 1956 A. FREEMAN 2,757,781
CONVEYOR SYSTEM
Filed Jan. 16, 1953 6 Sheets-Sheet 6

INVENTOR
Alfred Freeman
BY

United States Patent Office 2,757,781
Patented Aug. 7, 1956

2,757,781

CONVEYOR SYSTEM

Alfred Freeman, Isham, near Kettering, England

Application January 16, 1953, Serial No. 331,629

Claims priority, application Great Britain January 16, 1952

11 Claims. (Cl. 198—38)

The present invention is concerned with systems by means of which goods can be carried along and delivered or dealt with automatically at a predetermined place along the system, as selected by the loader or chosen automatically.

In the specification of patent application Serial No. 294,400 entitled "Improvements in Conveyor Systems" are described various forms and features of such conveyor systems, whereby goods transported on the systems can be automatically discharged at pre-selected stations en route.

Moreover this prior specification inter alia describes in more particularity different so-called index devices which are carried by the moving conveyor and are to be set in correspondence with the goods loaded on to the conveyor at the related part, so as to operate correlated means at the selected discharge station, thereby to effect delivery or "dumping" of the goods at this part. Particular index-setting means and discharging devices are also described in the patent application referred to.

It was also pointed out in the latter that the systems concerned were generally applicable to the transport of goods and articles of various kinds, although for convenience the mechanisms actually referred to were described in connection with the sorting and grading of lasts in boot and shoe factories.

The present invention is concerned with a further development of these and similar conveyor systems and is again applicable to the conveyance of goods and articles of widely-varying character and their automatic delivery or discharge, or their treatment whilst still on the conveyor, at different, pre-selected stations along the conveyor circuit. In this instance, however, the invention may find more advantageous application to the routing of articles to different points in successive stages in the manufacture or treatment of such articles. For this reason it will be more particularly described hereafter in relation to the different stages in the production of boots and shoes, but once again the proviso is added that this is only one example, selected for convenience, of the possible applications of the invention.

Generally stated, then, the present invention provides for the control of the travelling goods or articles by a punched card, the latter term being intended to connote any sheet-form element, rigid, semi-rigid, or even flexible, having therein perforations at one, or preferably more, locations.

These punched cards may be used to determine the setting of the index device travelling with the conveyor or may, alternatively or in addition, be used at the discharge or operating stations for controlling the selection of these stations. In either event, the index devices used in cooperation with the controlling punched card means will advantageously be of one of the forms described and claimed in our co-pending application Ser. No. 331,630.

Other features of the invention are hereinafter disclosed in the specification and claims.

Various embodiments of the invention and of mechanisms used therein will now be described, by way of example, with reference to the accompanying drawings in which:

Figure 8 illustrates a modified form of reader mechanism embodying the principles of the present invention, and is a cross section on the line VIII—VIII of Figure 9.

Figure 9 is a plan view of the same.

Figures 1, 2, 3:
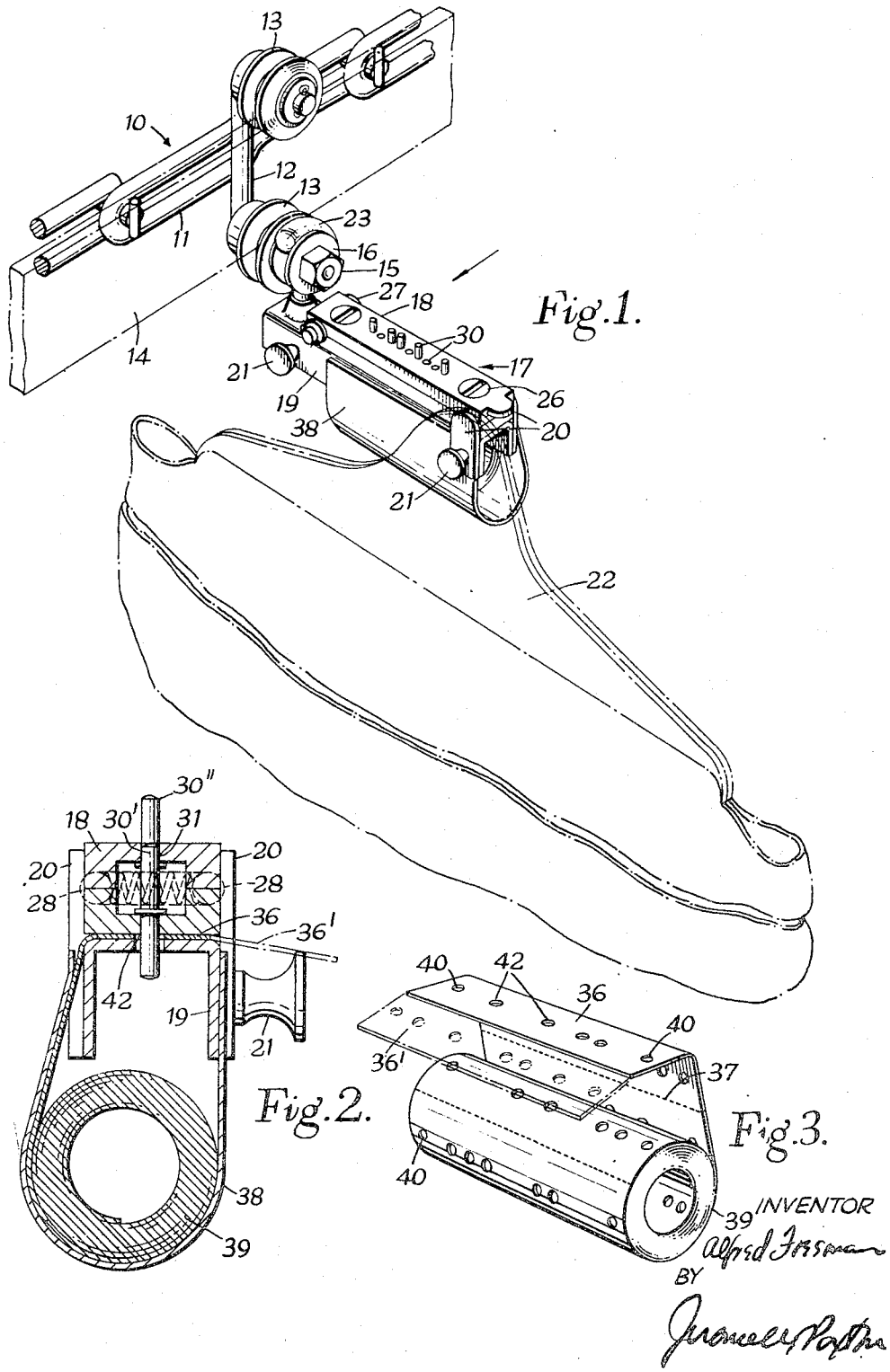
Figure 1 is a perspective illustration of one form of index device, controlled by a punched card, which can be used in this invention, this device being depicted with a work holder attached thereto and in its travelling condition on a chain conveyor.
Figure 2 is a vertical cross section through the index device of Figure 1.
Figure 3 is a perspective illustration of a roll of punched cards which is utilised in the embodiment of the invention illustrated in Figures 1 and 2.

Referring now to the drawings, the various mechanisms therein illustrated are each and all intended for use in a conveyor system of the general form described in prior patent application Ser. No. 294,400 i. e. comprising an endless chain conveyor which is intended, for instance, to circulate through a factory or workroom, this conveyor being arranged to carry laterally-extending index devices each having a set of adjustable elements for selecting and operating a corresponding reader mechanism, of which a number are arranged at the appropriate stations around the conveyor circuit.

The adjustable index elements are capable of projection or retraction, and the combination of "projections" and "retractions" represents the index combination to which the device is set. One or more of the reader mechanisms will usually be correspondingly set so that, when it reads or "senses" its particular combination on a passing index device, it will react and actuate a release means. This latter may be established so as to operate a catch or other means to cause discarding of goods carried by the conveyor at this part, or to trigger a mechanism performing an operation on passing work, or for other purposes.

Again, in some instances the various index devices are set by a common setting mechanism as they run through, say, a loading station, whilst in others setting mechanisms may be located at various points along the conveyor route. Furthermore there can be cases in which no index setting mechanism, at any rate no stationary mechanism of this character, is used in the system, the index then, for example, being held in a particular setting by means which travels with the device around the conveyor circuit.

In the present invention the various index devices are settable under the control of punched card means, that is either by a punched card located at a setting station or by a card which travels with the index device concerned, and/or a punched card is used as a control in the reader mechanism.

Referring now more particularly to the form of the invention illustrated in Figures 1 to 5, the arrangement here is that the conveyor circulates through a factory or shop, e. g. in a boot and shoe manufactory, past various machines for performing operations on the work in successive stages of shoe manufacture. As will be understood, different forms of shoe will demand different sets of manufacturing operations, i. e. each form of work requires to stop at different places along the conveyor route.

To enable this to be put into practice the operative at each station loads her finished work on to the conveyor and routes it to the next station appropriate to the particular "job," where the work is automatically discarded for the attention of the operative at this station, and so on. In this particular instance the arrangement is that an index device is associated with the work and is discarded from the conveyor with the latter, so that it can be set by the operative, using punched card means, in her own time before being re-embarked on the conveyor.

As seen in Figures 1 to 5, the conveyor chain is generally denoted 10 and comprises a series of articulated links 11 of one of the forms set forth in patent application Ser. No. 329,340. Thus each link has a cross piece 12 which is bent around at its ends to receive runners in the form of rollers 13 which are arranged to travel along a guide rail or bar 14. In this particular instance, however, the lower lateral limb of the cross piece 12 is extended somewhat and has secured thereto, by means of a nut 15, an outer and non-rotatable roller 16. This latter is intended to form a mounting for the index device which has generally been denoted 17.

This index device is generally in the form of a bar 18, which will hereinafter be called the index bar, mounted on an inverted channel piece 19 to which a work carrier can be attached. Thus the channel piece 19 is provided with upstanding lugs 20 at one end, one of these lugs, and the other end of the channel piece carrying studs 21 for attachment of the upper end of the work carrier which, in this particular instance, is represented by a bag 22 seen in phantom in Figure 1. The bag 22 is here indicated as mounted on the outer stud 21, but could alternatively be secured on the inner stud, or alternatively a form of bag can be used which is adapted to be attached to both these studs. Again it is to be appreciated that work holders other than bags can be carried by the channel piece or body 19.

This latter has, at its inner end, an upstanding hook 23 which is shaped so that it enters the groove in the roller 16, and serves then to attach the index device, with its work carrier, on the conveyor chain, as seen in Figure 1.

Examining the index bar more closely, it is to be noted that this comprises superposed upper and lower halves 24 and 25 which are clamped down together by screws 26. The bar is hinged at 27 to an ear on the channel piece 19 and, at its opposite and outer end, has spring pressed catch balls 28 cooperating with the lugs 20.

Figure 5:
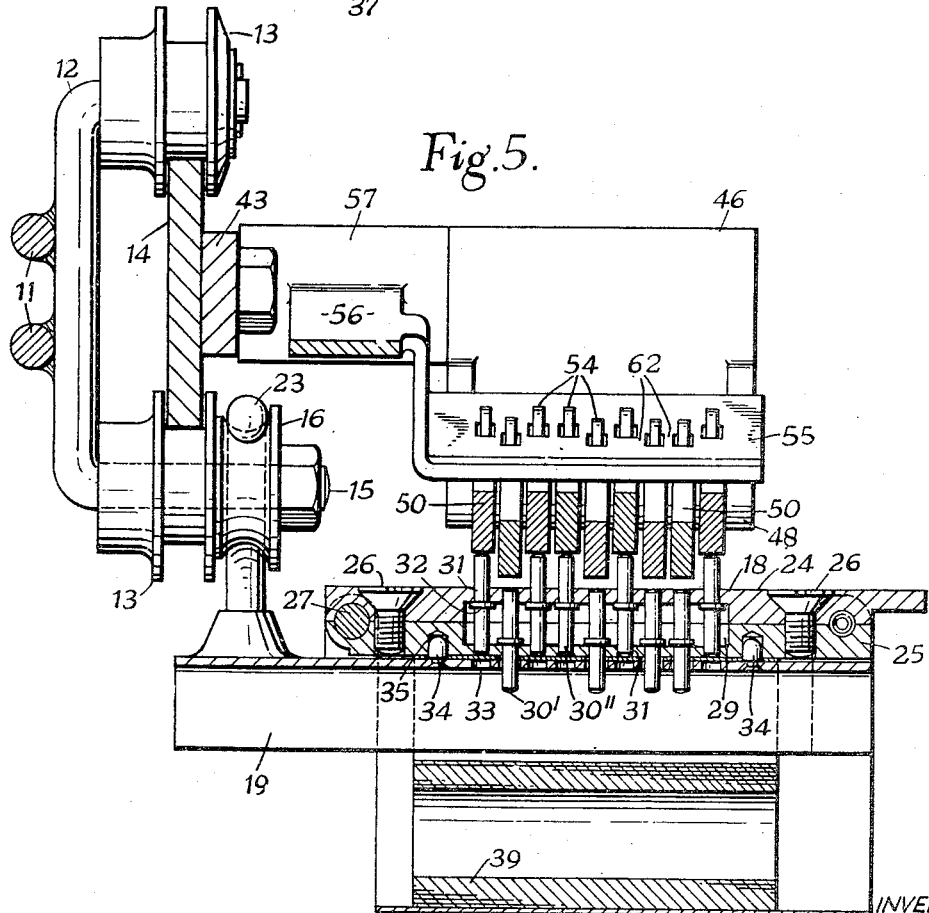
Figure 5 is a vertical cross sectional view illustrating the manner in which the index device of Figures 1 and 2 is arranged to cooperate with a reader mechanism at a discharge station in the conveyor circuit.

As will be more clearly seen from Figures 2 and 5, the composite index bar 18 is formed with an internal chamber 29 and serves to receive a series of slidable index elements or plungers 30 which are capable of upward projection from or downward retraction into the bar 18, the latter being provided at each of its upper and lower sides with a row of appropriate guide apertures 31 for this purpose. As will also be seen from Figures 2 and 5, each of the index elements is provided with an abutment collar 32 which limits its upward or downward movement.

The upper limb of the channel piece 19 is also furnished with apertures 33 in register with those (31) in the index bar, and in addition has, flanking the row of apertures 33, upstanding pips 34 entering corresponding recesses in the index bar when the latter is placed flat against the channel piece as seen in the various figures.

The pips 34 are intended to locate the punched card which determines the setting of the elements 30. This card, which is designated 36 and is conveniently of cardboard or stiff paper, is sandwiched between the index bar 18 and the top limb of channel piece 19 and holes 42 punched in this card allow the appropriate index elements (as 30') to pass therethrough, and therefore be retracted relatively to the index bar, whilst the other elements (as 30'') finding no accepting hole are projected from the bar.

Figure 4:
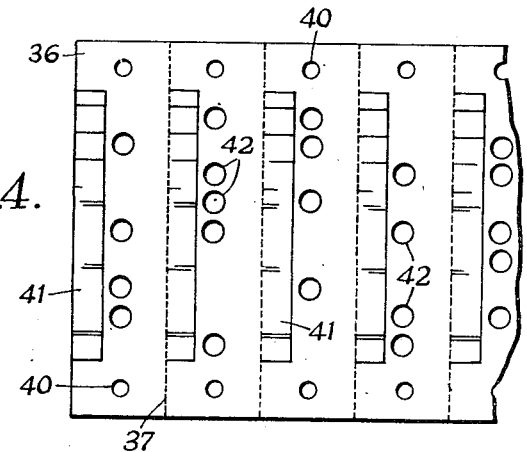
Figure 4 is a part of a developed plan view of a further form of punched card roll which is provided with markings to enable the punched cards to be utilised for work tickets or other record purposes.

The punched card is actually one of a series of integrally attached cards as depicted in Figure 3 or Figure 4, these cards being integrally hinged to one another along a line of scoring 37 and the attached series of cards, in use, being wound up into a roll 39.

As will be seen from the drawings, the channel piece 19 has a depending scroll 38 secured to one limb thereof, this serving to receive and support the roll 39 of punched cards during the use of the device. Hence, in using the mechanism concerned, the operative will swing back the index bar 18 about its pivot 27 to clear the index elements from the punched card at that time in the operative position, and then advance the roll to the next punched card and impale the latter on the studs 34 by means of end perforations 40 with which each card is provided, whereafter the bar is swung down again and secured in position by the catches 28 to provide the next operative setting of the elements 30', 30''. This enables the operative to despatch the work-carrying bag 22, hooked by her on the index device to the next appropriate station. If for any reason a change of destination is required, then of course a suitably selected punched card will be mounted in the operative position.

In the normal course, the previously-used card, which now projects from the index device as indicated in dotted lines at 36', can readily be detached by the operative for use, say, as a work ticket. To augment the utility of the punched cards for this purpose, they may each conveniently be provided with markings, as for instance the columns 41 (see Figure 4) for accountancy or like purposes. The detached cards can, for instance, be routed to a central office for work progress control and/or pay checking purposes, e. g. by placing it on a convenient receptacle (not shown) on the conveyor chain.

Again, instead of using a series of detachable cards, one card with a series of columns of perforations 42 may accompany the goods concerned through all the manufacturing stages, the composite card being moved forward a column by each operative in turn, so that when it reaches the end of its journey it gives a complete record of the work done. In this event, again, the card may have spaces for notation by the operatives or by an accountant, or for other purposes.

Figure 6:
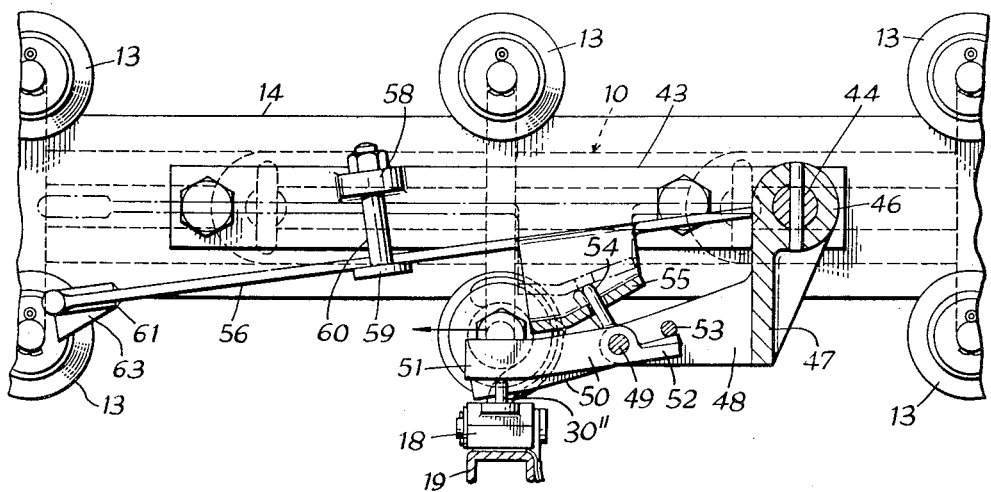
Figure 6 is a side elevation partly in vertical section, of the mechanism illustrated in Figure 5, but observed at right angles to the latter.
Figure 7:
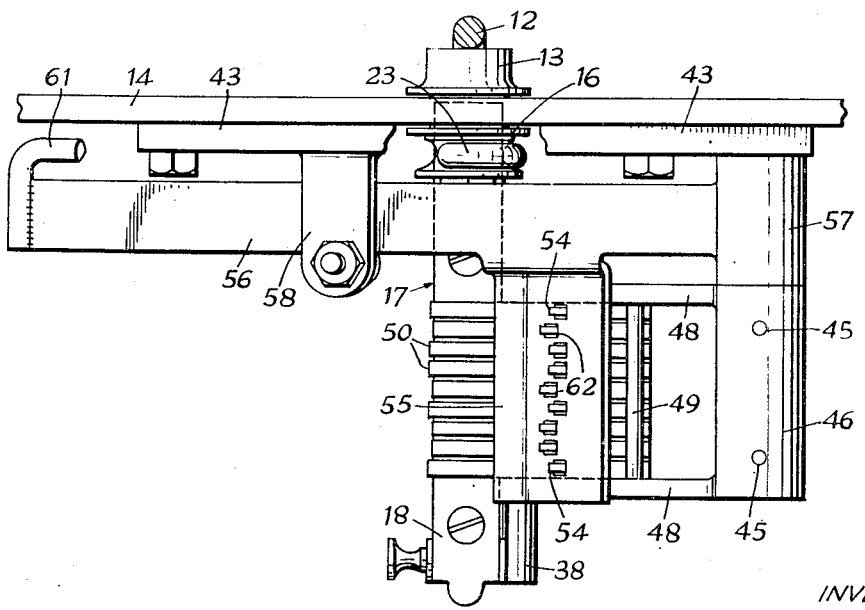
Figure 7 is a plan view of the mechanism seen in Figure 6.

A form of discharge mechanism, incorporating a reader for the passing index mechanism, such as has previously been described, is illustrated in Figures 5 to 7. In this particular application of the invention, one of these discharge mechanisms can be arranged on the conveyor rail 14 at each station corresponding to a machine in the workshop. Hence, in this arrangement, the operative at any particular machine will in due course receive work automatically discarded at her station, perform the requisite operations on, say, the embryo shoe, and then reset the discarded index device for travel to the next appropriate station by adjusting the roll of punched cards in the manner indicated above, and then replace the work on the chain so that it will be automatically re-routed to this further station, thereafter being discarded and dealt with in the same way, and, if appropriate, re-machined and passed on until it reaches its ultimate destination.

The discharge mechanism illustrated in Figures 5 to 7 is shown as mounted on the rail 14 by means of a plate 43 which is bolted to the rail and has, at its trailing end (in the direction of travel of the conveyor) an outstanding spindle 44 to the outer end of which is rigidly secured, as by pins 45, a fixed sleeve 46 having a depending bracket 47 formed with a pair of parallel forwardly extending cheeks 48. Mounted between these cheeks is a cross rod 49 on which is pivotally mounted a series of side-by-side reader fingers 50. These fingers 50 are of identical form and are arranged side by side and with a spacing so that each of them corresponds to one of the elements 30 of each passing index device, as is clearly seen from Figure 5 of the drawings.

Each finger 50 is of lever form, with the arm which is disposed forward of the pivot rod 49 of preponderating weight, so that this part 51 of the finger will hang forward under gravity. At its rear part, each finger is formed with a tail 52 cooperating with a stop bar 53, also extending transversely between the cheeks 48, to limit the extent of downward swinging of the finger parts 51. Finally, each of the fingers is formed with an upstanding pin 54 which cooperates with a reader plate 55 arranged transversely of the mechanism above the finger 50.

The reader plate 55 stands out laterally from an operating arm 56 which is formed at its rear end with a sleeve 57 which is rotatably disposed on the spindle 44. This arm 56 is therefore capable of pivotal movement about the spindle 44, but its up and down movement is limited by a lug 58 extending laterally from the plate 43 and the head 59 on a bolt 60 secured to this lug. At its forward end, the operating arm 56 is provided with a hook-form abutment 61 which cooperates with the hook 23 on the index device to push this off its fixed roller 16 when the abutment nose 61 is at the right level.

The reader plate 55 is provided with two staggered rows of holes 62 for cooperation with the pins 54, these holes being grouped in accordance with the index setting to which it is intended that this particular station shall be responsive. As will be observed from Figures 5 to 7, these holes represent the particular combination of projected and retracted elements which is seen in Figure 1 of the drawings. Thus, as an index device set in this way passes beneath the fingers 50, the projected elements 30' will lift certain of these to swing the corresponding pins 54 into the advance position, whilst the pins 54 corresponding to the retracted elements 30' will continue to hang forwards, in fact in register with the corresponding aperture 62 in the reader plate. As a result the latter will drop down to bring the nose 61 into alignment with the travelling hook 23 and, when the two meet, the hook will be pushed back around its roller and the index device and work carrier will be ejected from the conveyor.

On the other hand if an inappropriate setting passes, this will fail to adjust the various pins into register with the holes 62, so that the reader plate 55 will remain raised and the nose 61 will allow the hook 23, and hence the index mechanism and work, to pass. Means can be provided for resetting the arm 56, after it has been tripped downward by a correct index combination, as for example by the provision of a chamfered piece 63 (seen in Figure 6), which cooperates with the roller 16 for this purpose.

In the foregoing embodiment of the reader and discharge mechanism, use is made of a rigid reader plate for testing the passing index devices. In another arrangement, now to be described, a punched card can be incorporated in the reader mechanism for the same purpose, this having the attribute of enabling the effective discharge combination at a particular station to be varied by a simple substitution of a different punched card. An arrangement of this sort is illustrated in Figures 8 and 9, and it is to be pointed out in this connection that such an arrangement can be used in cases where the index device incorporates a punched card travelling therewith (as in the example illustrated in Figures 1 to 7) or is otherwise used to set the index mechanism (as in the example to be later described), or where the index device is set by some other means not involving a punched card, for example an index-setting arrangement of the form more particularly described in patent application Ser. No. 294,400.

As will be seen from Figures 8 and 9, the discharge mechanism incorporates a reader plate (as does that in the previous example), the plate, here denoted 64, being pivoted on a rod 65 between a pair of cheeks 66 mounted on a bar 67 secured to the rail 14 and extending transversely across the conveyor path to the side thereof carrying the index devices 17. The reader plate 64 is in this case furnished with a trip catch 68 and with a detachable frame 69 by means of which a punched card 70 can be clamped to the plate in appropriate fashion for cooperation with the pins 71 on fingers 72 pivoted on a cross bar 73 extending between cheeks 66. As in the previous case each of the fingers 72 is provided with a tail 74 cooperating with the stop 75 to limit the degree of downward swinging of the fingers.

As an illustration of the many modified uses to which the invention can be applied, in this particular instance the index device 17 is assumed to be rigidly connected to the conveyor chain so as to extend laterally therefrom and it is also assumed that the index elements thereon are of a form capable of being set at some appropriate station in the conveyor circuit and of retaining this setting whilst the index device travels around the conveyor route. It is further assumed that this particular form of the invention is intended for use in boot and shoe factories, and that, for example, each index device is associated with a last holder as described in patent application Ser. No. 294,400 this having a closure mechanism which is releasable by operation of a member, here denoted 76, which is linked to the trip mechanism of the last carrier by a link 77.

It need here only be added that, when an index device 17 bearing the correct combination of projected and retracted elements 30" and 30' reaches the discharge mechanism, the various fingers 72 are operated to bring their pins 71 into correct status to pass through the holes 62 in the particular punched card 70 employed, so that the plate 64 will be allowed to pivot forward to bring its trip nose 68 into the operative position in the path of the member 76. The extent of this downward travel is limited by the abutment of the pin 78 on the plate 64 with the inner cheek 66.

If the discharge mechanism last described is to be used with an index device which does not involve the use of a travelling punched card, as in the first example illustrated, the form of the index device itself will be modified to provide for the retention of the index elements in a set combination.

Figure 10:
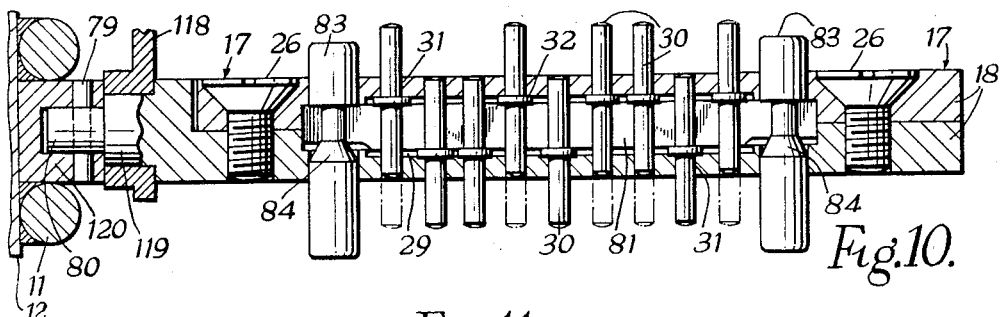
Figure 10 is a vertical cross section through a form of index device which can be used in a conveyor system according to this invention, for example in connection with the mechanism illustrated in Figures 6 to 9 and Figures 13 to 15 of the drawings.
Figure 11:
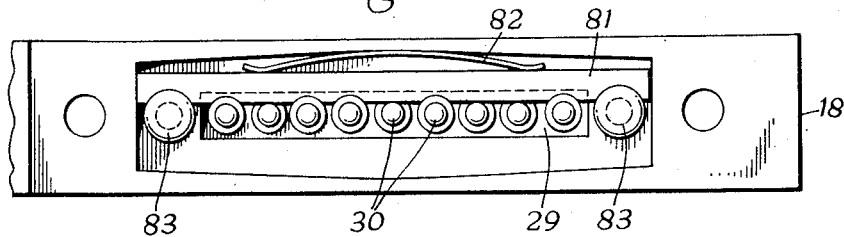
Figure 11 is a plan view of the lower half of the index bar according to Figure 10.
Figure 12:
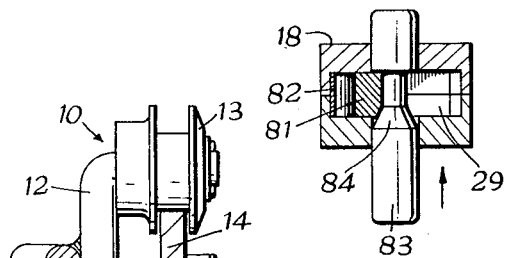
Figure 12 is a transverse cross section through the complete index bar of Figure 10.

An instance of such a modified construction is seen in Figure 10 to 12 of the drawings, which will now be referred to. As is here apparent, the index device 17 is again composed of two superimposed halves 18 which together form a composite bar extending laterally from the conveyor chain, in this case being secured to the cross piece 21 of the latter by a pin 79 passing through a spigot 80 on the inner end of the index bar. Here again, moreover, the two plates 18 of the composite bar are interconnected by screws 26 and define an internal chamber 29 receiving the collars 32 on the various index elements 30, which are of the form illustrated in the first embodiment described herein.

In this particular instance, however, there is additionally mounted in the chamber 29 a locking bar 81 which is adapted to cooperate with the collars 32 on the various index elements 30 to retain these latter in projected or retracted condition, as the case may be. The bar 81 is normally urged into its locking position by a leaf spring 82 arranged in the chamber, but is movable away from the elements 30, when it is required to release these for setting purposes, by means of a locking and unlocking plunger 83 arranged one adjacent each end of the chamber 29.

As is clearly seen from Figures 10 and 12, each of the locking plungers 83 is waisted at its central part by an annular groove having a lower face 84 of frustoconical formation and an upper face which is perpendicular to the axis of the element. Hence, when the locking plungers 83 meet an abutment at a setting station during the travel of the index device through this station, which abutment will conveniently be of bevelled form, these plungers are raised relatively to the body of the index device, thus pushing back the locking bar 81 against the action of its spring 82 and releasing the elements 30 for setting as required.

After such setting, a similarly chamfered abutment, arranged in the path of the index bar is arranged to depress each locking plunger 83, thereby permitting the return of the locking bar 81 to grip and set the index elements in the selected combination, and this will be retained during the whole of the travel of the index device until a fresh unlocking situation is encountered.

Figure 13:
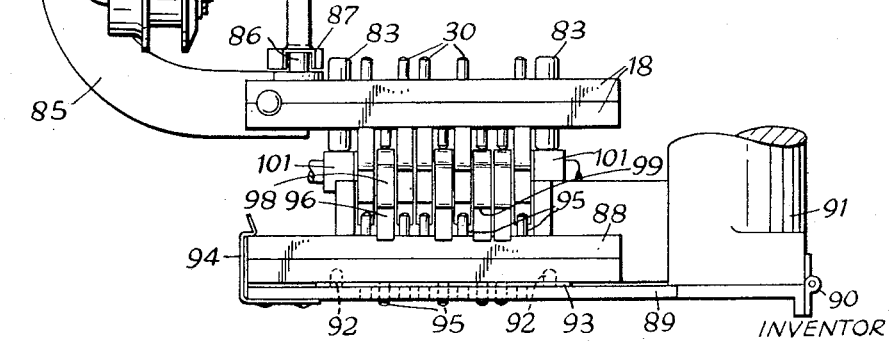
Figure 13 is a front elevation of another form of the invention, this drawing illustrating a mechanism, again controlled by a punched card arrangement, for setting passing index devices on a travelling conveyor chain.
Figure 14:
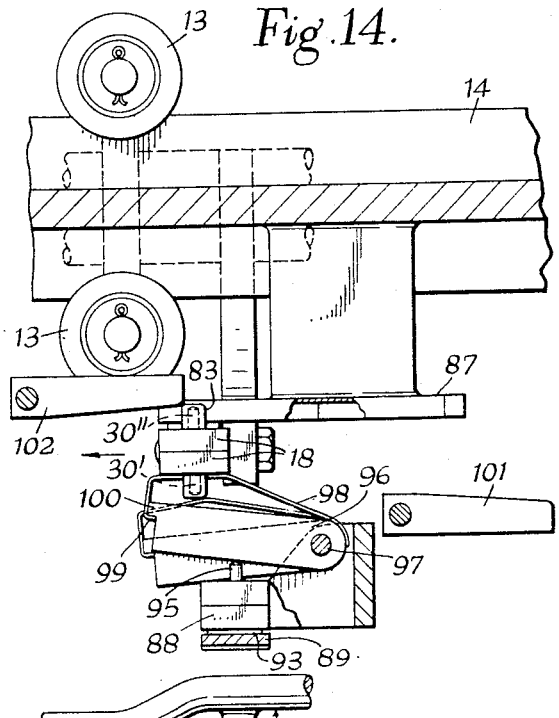
Figure 14 is a side elevation, with parts broken away and omitted in the interests of clarity, of the mechanism appearing in Figure 13.
Figure 15:
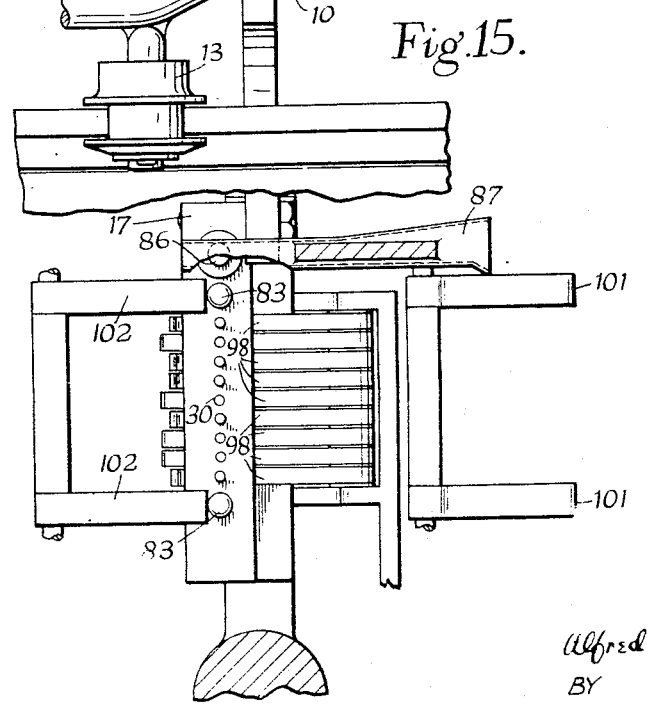
Figure 15 is a plan view of the same mechanism.

Finally we have illustrated in Figures 13 to 15 a mechanism which can conveniently be employed in accordance with the invention for the purpose of setting the elements of an index device to a chosen combination, this mechanism incorporating the use of a controlling punched card.

In this case we have instanced an arrangement in which certain links of the conveyor chain 10, which travels along a guide rail 14 as in the previous instances and which will carry work holders or carriers of suitable form in detachable or permanent fashion, have, extending laterally from the lower side thereof and supported by a curved arm 85 secured to the cross piece 12 for this purpose, an index bar 18 of the same general form as that described in connection with Figures 10 to 12. Hence, as will be observed from the drawing, the index device includes a plurality of index elements 30 and end locking plungers 83, whilst in this particular instance the index bar 18 is shown as additionally provided at its inner end with an upstanding stud 86 cooperating with a longitudinal channel 87 at the index-setting station to ensure correct positioning of each passing index device at this setting stage.

In this instance the setting of the passing index device is controlled by a transverse bar 88 which is mounted beneath but astride the path of the passing index devices, this bar 88 cooperating with a plate 89 which is hinged at 90 to a fixed upright 91. This plate has a pair of spaced pins 92 on which a punched card, depicted at 93 in Figure 13, can be impaled, whereafter the plate 89 is adapted to be swung up and slipped, as by the spring catch 94, in position below a series of plungers 95 which are loosely slidable in the bar 88. Thus the plungers 95 will be retracted or projected, according as they find or not a perforation in the punched card 93.

The plungers 95 are in a row in register with the index elements and cooperate with levers 96 which are likewise of a number and at a spacing corresponding to the elements 30 of the index devices passing thereover, these levers 96 being pivoted at a common cross spindle 97 and each having an upstanding, arched leaf spring 98 with its outer and free edge 99 cooperating with a nose 100 on the associated lever 96. These leaf springs 98 are arranged to bear on the lower edge of the corresponding elements 30.

In addition, the mechanism incorporates a pair of ramps 101 and a pair of fixed ramps 102, which are utilised to operate the locking plungers 83 on the passing index devices so as, respectively, to cause unlocking and relocking of elements 30.

Thus, an index device passing through this setting station will first have its elements 30 unlocked by the action of the ramps 101 on the locking plungers 83 and will then encounter a combination of raised and depressed leaf springs 98 determined by the punched card 93. The various elements 30 will be correspondingly projected or retracted, and the ramps 102 will function to depress plungers 83 and re-lock elements 30 in the set combination.

As will be appreciated, many modifications are possible in the form and use of the mechanisms described. Thus, to mention one point, in the arrangement illustrated in Figures 1 to 5 an operative can quickly despatch the work to any chosen location, not necessarily that in particular sequence, by selection of the appropriate column on the card. Thus, for instance, should the work be spoiled in an operation, it can be set to return straight away to the foreman using, say, the last column on the card, or a special card.

In either of the immediately preceding instances, moreover, the particular mechanism described lends itself to the feature whereby any of the index bars and their plungers, or a modified, preferably separately mounted, version thereof can be used to punch a blank card or paper for subsequent employment in despatching goods to a particular destination.

What I claim then is:

1. A conveyor system comprising a conveyor to transport goods, a plurality of index devices carried by the travelling conveyor, each said index device including a plurality of adjustable elements each capable of alternative projection or retraction thereby to set the device to a chosen combination, a plurality of reader mechanisms along the path of travel of said index devices and each responsive to a predetermined index combination, trip means associated with each reader mechanism and adapted to be brought into operation by its reader mechanism when the latter is operated by the correlated index combination and means for holding a punched card positively positioned relatively to said elements so that holes in this card are disposed to allow the passage of selected members and thus determine the effective combination of projected and retracted elements.

2. A conveyor system according to claim 1, in which at least one of the reader mechanisms has a pivotably-mounted member carrying a mounting for a punched card, and has a plurality of rockably-mounted feeler fingers positioned for operation by passing index elements and cooperating with the punched card on said pivotably-mounted member to pass through the apertures in said card when actuated by the correlated index combination and allow said member to operate the trip means.

3. A conveyor system according to claim 1 further including a stationary index setting mechanism arranged in the path of travel of the index devices with said conveyor, such index setting mechanism comprising abutment means adjustable in said mechanism into the path of the elements of the passing index devices, and a holder for applying a punched card against said abutment means to determine their respective positions relatively to the elements of passing index devices.

4. A conveyor system according to claim 3, in which the abutment means comprise a series of pivotably-mounted levers each carrying a leaf spring at its upper side, and a corresponding plurality of plungers slidable in a mount under the control of said punched card to determine the position of the corresponding lever and its spring.

5. A conveyor system according to claim 4, in which the plungers are loosely and vertically slidable in said mount and the holder is hinged on said mount and has means for securing it against the under side of the latter, whereby the punched card in said holder effects the lifting of predetermined plungers.

6. A conveyor system according to claim 1, in which a punched card is arranged to determine the setting of each index device and to travel with the conveyor, the index device having movable plunger elements and means for attachment of the card such that punched holes in the latter register with appropriate plunger elements to allow these to be retracted, whilst the other elements remain projected, thereby setting up a combination of projected and retracted index elements in the device for operation of a corresponding reader mechanism.

7. A conveyor system according to claim 6, in which the index device comprises a bar hinged to a supporting member having means for locating a punched card thereon, said bar being formed to receive the plunger elements and allow them to be projected or retracted so as to bear on or pass through a punched card sandwiched between the bar and the supporting member.

8. A conveyor system according to claim 7, in which the supporting member has a bracket or scroll depending from one side thereof to form a holder for a plurality of detachably interconnected punched cards.

9. A conveyor system comprising a conveyor to transport goods, a plurality of index devices adapted to travel with the conveyor so as to extend therefrom, each said index device including a plurality of index elements each capable of alternative projection or retraction, means for mounting a punched card in proximity to said index elements to determine, by mechanical abutment with the card or passage through a perforation therein, the selected combination of projected and retracted elements exhibited by the particular index device concerned, a plurality of stationary reader mechanisms disposed along the conveyor route in the path of the successive index devices and having a movable part which is operable in response to a passing index device in which all the index elements exhibit an approved combination of projections and retractions, but which is held inoperative by any one index element which does not conform with the said approved combination, and trip means associated with each reader mechanism and responsive to the operation of the movable part of the associated reader mechanism.

10. A conveyor system according to claim 9, in which each index device carries a punched card holder, and this holder is formed to receive and hold a roll of detachably-connected punched cards with one of these cards mounted in position in the index device to determine the particular index combination exhibited by the elements of this device.

11. A conveyor system comprising a conveyor to transport goods, a plurality of index devices adapted to travel with the conveyor so as to extend therefrom, each said index device including a plurality of index elements each capable of alternative projection or retraction, a plurality of stationary reader mechanisms disposed along the conveyor route in the path of the successive index devices and having a movable part which is operable in response to a passing index device in which all the index elements exhibit an approved combination of projections and retractions, but which is held inoperative by any one index element which does not conform with the said approved combination, punched card means carried by each said reader mechanism and positioned to allow the passage of mechanical elements through the perforations thereof and thus determine the acceptable combination of index projections and retractions and trip means associated with each reader mechanism and responsive to the operation of the movable part of the associated reader mechanism.

References Cited in the file of this patent

UNITED STATES PATENTS

| | | |
|---|---|---|
| 1,803,391 | Jennings | May 5, 1931 |
| 2,315,659 | Russell | Apr. 6, 1943 |
| 2,328,317 | Wentworth | Aug. 31, 1943 |